United States Patent
Sadiku

(10) Patent No.: US 6,640,416 B1
(45) Date of Patent: Nov. 4, 2003

(54) METHOD FOR AXIALLY DRAWING COILS INTO STATORS OR ROTORS OF ELECTRIC MACHINES

(75) Inventor: Sadik Sadiku, Neuberg (DE)

(73) Assignee: Elmotek Elecktro-Motoren-Technik GmbH (DE)

( * ) Notice: Subject to any disclaimer, the term of this patent is extended or adjusted under 35 U.S.C. 154(b) by 0 days.

(21) Appl. No.: 09/646,562
(22) PCT Filed: Jan. 18, 2000
(86) PCT No.: PCT/EP00/00361
§ 371 (c)(1), (2), (4) Date: Sep. 20, 2000
(87) PCT Pub. No.: WO00/44081
PCT Pub. Date: Jul. 27, 2000

(30) Foreign Application Priority Data

Jan. 21, 1999 (DE) .......................... 199 02 198

(51) Int. Cl.[7] ................. H02K 15/00; H02K 15/14; H02K 15/16
(52) U.S. Cl. ............... 29/596; 29/565; 29/606; 29/732; 29/734; 29/736; 29/739
(58) Field of Search ................. 29/565, 596, 606, 29/732, 734, 736, 739

(56) References Cited

U.S. PATENT DOCUMENTS

| | | | | |
|---|---|---|---|---|
| 3,968,556 A | * | 7/1976 | Morr | 29/596 |
| 4,204,318 A | * | 5/1980 | Kirbis et al. | 29/734 |
| 4,205,429 A | * | 6/1980 | Fooyontphanich et al. | 29/596 |
| 4,247,978 A | * | 2/1981 | Smith | 29/596 |
| 4,276,689 A | * | 7/1981 | Urick et al. | 29/596 |
| 4,281,450 A | * | 8/1981 | Bale | 29/596 |
| 4,299,025 A | * | 11/1981 | Lauer et al. | 29/596 |
| 4,400,871 A | * | 8/1983 | Barrera | 29/596 |
| 4,416,058 A | * | 11/1983 | Henry et al. | 29/734 |
| 4,433,475 A | * | 2/1984 | Kubota et al. | 29/736 |
| 4,476,625 A | * | 10/1984 | Bricker et al. | 29/734 |
| 4,477,966 A | * | 10/1984 | Napierski | 29/596 |
| 4,489,764 A | * | 12/1984 | Walker | 140/92.1 |
| 4,521,958 A | * | 6/1985 | Barrera | 29/734 |
| 4,536,954 A | * | 8/1985 | Hattori | 29/736 |
| 4,594,775 A | * | 6/1986 | Stanley | 29/736 |
| 4,739,549 A | * | 4/1988 | Rist | 29/736 |
| 4,741,093 A | * | 5/1988 | Rist | 29/596 |
| 4,831,715 A | * | 5/1989 | Witwer | 29/596 |
| 4,955,130 A | * | 9/1990 | Bricker et al. | 29/734 |
| 5,060,364 A | * | 10/1991 | Scherer | 29/734 |
| 5,357,670 A | * | 10/1994 | Taji et al. | 29/734 |
| 5,533,252 A | * | 7/1996 | Kawamura | 29/734 |
| 5,802,706 A | * | 9/1998 | Barrett | 29/736 |
| 5,826,321 A | * | 10/1998 | Pease | 29/426.1 |
| 6,148,499 A | * | 11/2000 | Sadiku | 29/596 |

* cited by examiner

*Primary Examiner*—A. Dexter Tugbang
*Assistant Examiner*—Paul D Kim
(74) *Attorney, Agent, or Firm*—Larson & Taylor, PLC

(57) ABSTRACT

Prewound coils are axially drawn into grooves of stators or rotors of electric machines. This is performed by means of a draw-in star, which can be pushed forward through their bores, behind which cover strips (16), made of insulated material, are pushed into the grooves (12) in front of their opening slits in the course of the draw-in process. To prevent the cover strips (16) from being partially pulled out of the grooves (12) when the draw-in star (28) is pulled back, it is provided that the cover strips (16) are supported against a retrograde movement during a defined first section of the return movement of the draw-in star (28), for example in that the pushers remain in their pushed-forward position during the first phase of the return movement of the draw-in star (28).

4 Claims, 1 Drawing Sheet

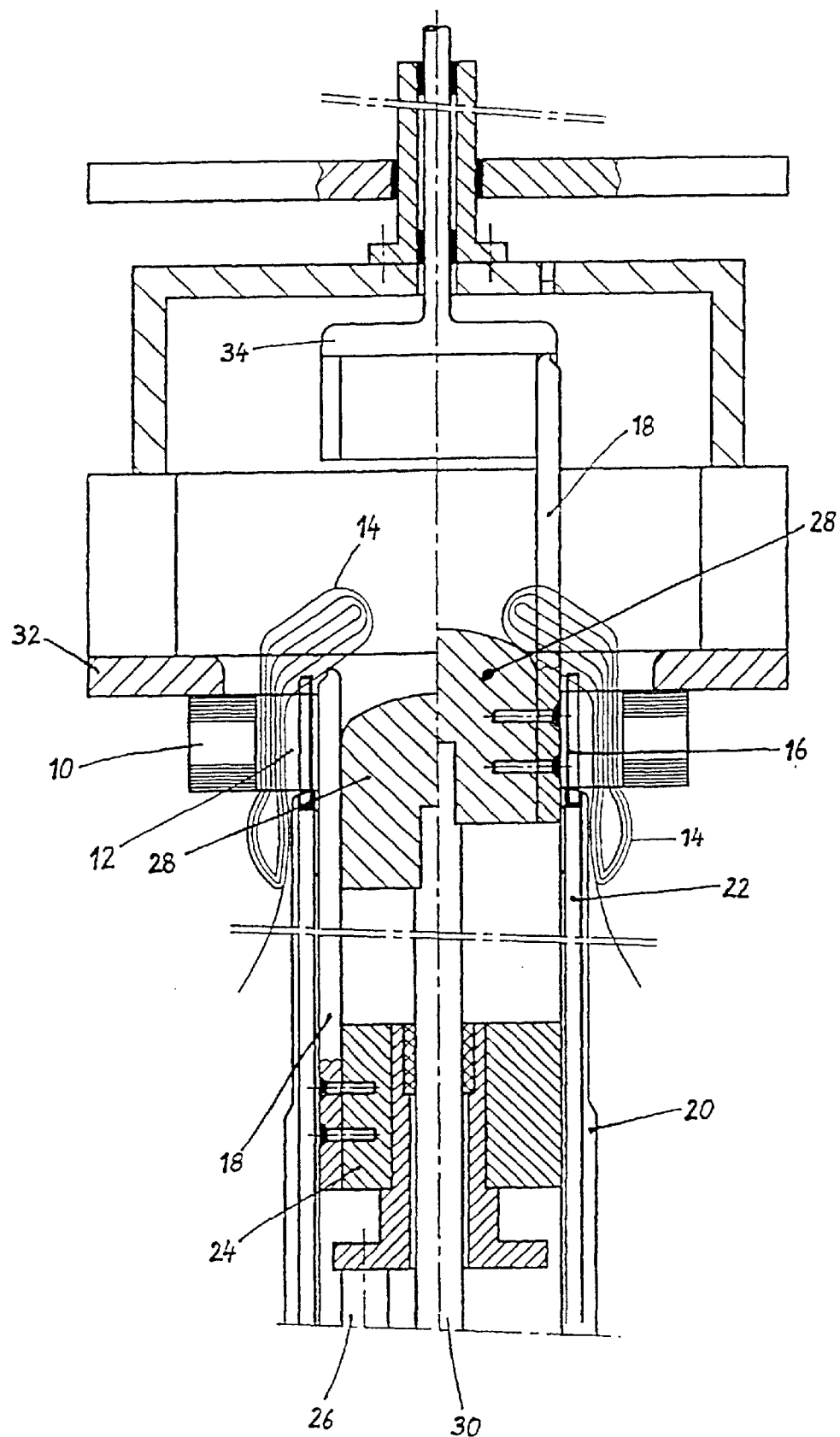

METHOD FOR AXIALLY DRAWING COILS INTO STATORS OR ROTORS OF ELECTRIC MACHINES

The invention relates to a method for axially drawing prewound coils into grooves of stators or rotors of electric machines by means of a draw-in star which can be pushed forward through the bores of the respective stators or rotors, wherein during the draw-in process cover strips of an insulating material are pushed behind the draw-in star into the grooves in front of their opening slits. The invention furthermore relates to a device suitable for the execution of the said method.

The draw-in devices used customarily consist of circumferentially arranged parallel draw-in laminations for covering the sharp edges of the stator or rotor core at the opening slits of the grooves, of parallel cover strip laminations, which are arranged in a ring shape directly radially outside of the draw-in laminations, for guiding the cover strips, and a draw-in star, which is axially displaceable in the space enclosed by the laminations. After the coils to be drawn in have been suspended in the slits between the laminations, and a stator or rotor core has been placed on the free ends of the draw-in laminations, the draw-in star moves forward up to the core and through its bore, takes along the coils in the process and draws them into the grooves of the core. Reference is made to DE-PS 19 18 485 and U.S. Pat. No. 3,968,556 in connection with the mode of functioning of such a draw-in device.

The draw-in star customarily is in the shape of a mushroom head with radial protrusions, which extend through the opening slits of the grooves of the core and push the coil wires in the grooves away from the opening slits, so that the cover strips in a position directly in front of the opening slits can be axially pushed into the grooves. In its end position, in which it has been completely pushed forward through the bore of the stator or rotor, the draw-in star also pushes the portions of the coil extending past the end face of the core, the so-called winding heads, radially outward.

Up to now, at the end of the draw-in movement, the pushers, which are used for pushing the cover strips into the grooves, have been retracted simultaneously with the draw-in star, whose radial protrusions frictionally slide along the cover strips in the course of this movement. It is possible here that the draw-in star pulls individual cover strips partially out of the grooves again. Because of this, the respective stators or rotors become rejects.

The object of the invention is based on improving the quality of the production, and in accordance with the proposal of the invention, this object is attained in connection with the method in that, following the complete draw-in of the coils, the cover strips pushed into the grooves are supported against a retrograde movement during a defined first portion of the return movement of the draw-in star.

The invention has the advantage that, following the partial retraction of the draw-in star from the end position, in which it was pushed forward the farthest, the coils which had been radially pushed back toward the exterior can partially spring back toward the interior, in the course of which they push the cover strips next to the opening slits firmly against the groove wall. The cover strips, which are clamped into place in this way, thereafter maintain their predetermined position, even if in the further course of the return movement of the draw-in star the support of the cover strips is also pulled back.

The device proposed for executing the method of the invention has, in partial agreement with the device in accordance with U.S. Pat. No. 3,968,556, a holder for a stator or rotor of an electric machine, a draw-in star, which can be displaced through its bore for drawing coils into its grooves, as well as cover strip laminations and pushers for introducing cover strips made of an insulated material into the grooves of the stator or rotor in front of their opening slits in the course of the forward movement of the draw-in star, and it is distinguished over the known device in that the pushers remain in their pushed-forward position, at least during a defined first portion of the return movement of the draw-in star, so that they axially support the cover strips and prevent them from being pulled back by the draw-in star through friction.

Although with the device in accordance with U.S. Pat. No. 3,968,556 cover strips are also axially supported against being pulled back during the return movement of the draw-in star, this is a set of further cover strips, which is only to be pushed into the grooves of core of a following stator during the next draw-in movement, and which, during a first conveying step, have initially been pulled out of the cover strip magazine by additional rear pushers, but were not pushed into the stator core during the same step, and which now must be supported in the rearward direction by small contact faces attached to the cover strip laminations, so that they are not taken along in the course of the return movement by the front pushers sliding along them.

The single FIGURE shows an exemplary embodiment of the invention.

Stator core 10 are represented there, into whose grooves 12 coils 14 are drawn. In the customary manner the grooves 12 have opening slits on the radially inward side toward the stator bore, which extend over the height of the stator core 10. The coils 14 are inserted through the opening slits into the grooves 12. Thereafter, the opening slits of the grooves are closed by strips of insulating material, so-called cover strips 16, which hold the coils 14 back in the grooves 12.

The draw-in device represented in the drawings, which is used for drawing the coils 14 into the stator core 10, is of a conventional construction. It consists of a ringshaped arrangement of parallel draw-in laminations 18, which cover the inner teeth of the stator core 10, in particular their sharp-edged corners and the opening slits of the grooves 12, and in this way prevent damage to the coil wire. A ring-shaped arrangement of parallel cover strip laminations 20, which are stationary and extend as far as the lower front face of the stator core 10, is located directly outside of the draw-in laminations 18. The cover strip laminations 20 are arranged on the circumference in respect to the draw-in laminations 18 in such a way, that respectively one cover strip 16, which is guided on two adjoining cover strip laminations 20 and is pushed upward by axially displaceable pushers 22, called cover strip plungers, is respectively inserted into a groove 12 next to the opening slits of the latter. The length of the cover strips 16 is only slightly greater than the height of the stator core 10.

The draw-in laminations 18 are screwed at their lower ends to a support 24, which can be maintained stationary during the entire draw-in operation. As shown on the left side of the drawings, in this position the free ends of the draw-in laminations 18 project past the free ends of the cover strip laminations 20 by slightly more than the height of the stator core 10. If, following a series of stator core 10 of a defined height, another series with a different height is to be provided with coils 14, it is possible to change the level of the support 24, including the draw-in laminations 18, by means of a suitable axial adjustment of a first drive rod 26.

A draw in star 28 is arranged axially displaceably in the central space between the draw in lamination 18, and extends with radial protrusions between the draw-in laminations 18 as far as the groves 12 of the stator core 10. A second drive rod, indentified by 30, of the draw-in star 28 extends centrally through the support 24 of the draw-in laminations 18. The actuating drive of the draw-in laminations,18 which is only indicated by the first drive rod 26, as well as the displacement drive of the draw-in star 28, and also finally the drive mechanism of a support, not represented, of the cover strip plungers 22, can be controllable electric drive mechanism, whose rotating movement can be converted into the axial longitudinal movement, for example by means of a screw-and-nut gear.

As shown on the right side of the drawings, in a known manner the lower ends of some laminations 18 can be screwed to the draw-in star 28 at critical locations. These are then called "laminations being taken along".

Prior to the start of the drawing-in process, with the draw-in star 28 retracted downward, the coils 14 are suspended in the spaces between the draw-in laminations 18 in such a position at the circumference that thereafter, when the stator core 10 have been placed on the upper ends of the draw-in laminations 18 so that they are in contact with the cover strip laminations 20, they are pulled into the grooves 12 provided for them by moving the draw-in star 28 upward. During the draw-in movement, the stator core 10 are maintained in place by means of a hold-down device 32. The drawings furthermore show the use of a so-called alignment star 34, which is used for keeping the draw-in laminations 18 parallel, but which is not important in connection with the present invention.

On the right side of the drawings, the draw-in star 28 is represented in its uppermost end position in which it has pulled the coils 14 completely through the opening slits of the grooves 12. In this uppermost position of the draw-in star 28, the coil wires in the area of the upper edge of the stator core 10 are also pushed radially outward away from the opening slit of the groove by the radial protrusions of the draw-in star 28. During the draw-in movement the cover strips 16, while being pushed forward by the cover strip plungers 22, follow with their upper edges the top, arched in the shape of a mushroom head, and the radial protrusions, of the draw-in star 28, until they also project slightly above the upper front face of the stator core 10. Although they are customarily provided with a collar, which is intended to prevent their sliding back downward, it happens quite often that, because of friction, some of the cover strips 16 are pulled downward out of the grooves of the stator core 10 again when, in accordance with the customary method the draw-in star 28 begins to move back downward out of its uppermost position shown, and the cover strip plungers 22 are also simultaneously pulled downward. To prevent this, it is provided by means of the represented device that the axial drive mechanism, not represented, of the cover strip plungers 22 still keeps them in the uppermost position while the draw-in star 28 moves through the first section of, for example 10 to 15 mm, of its return travel downward (see the intermediate phase represented on the left side of the drawings). Following this initial withdrawal of the draw-in star 28, the upper areas of the coils 14, which were pushed radially back toward the exterior by the top of the draw-in star 28, can push back radially inward as far as the cover strips 16 which close the opening slit. In the course of this they clamp the cover strips 16 firmly against the groove wall and, when following the intermediate phase represented on the left side of the drawings, the cover strip plungers 22 are also retracted during the further return movement of the draw-in star 28, there is no longer any danger that the cover strips 16 are also taken along and are displaced out of their intended position.

What is claimed is:

1. A method for axially drawing prewound coils into grooves of stators or rotors of electric machines by means of a draw-in star which can be pushed forward through bores of the respective stators or rotors, said method comprising:

pushing cover strips of an insulating material behind the draw-in star into grooves of said stator or rotor in front of opening slits of the grooves wherein following the complete draw-in of coils, the cover strips pushed into the grooves are supported against a retrograde movement during a defined first portion of a return movement of the draw-in star.

2. The method in accordance with claim 1, wherein the cover strips are supported by drive members which have pushed them into the grooves.

3. A device for axially drawing prewound coils into grooves of stators or rotors of electric machines, said device comprising:

a holder for a stator or rotor of an electric machine, a draw-in star, which can be displaced through a bore of the stator or the rotor for drawing coils into grooves of the stator or the rotor, and cover strip laminations and pushers, the pushers radially spaced from the draw-in star for introducing cover strips made of an insulating material into the grooves of the stator or the rotor in front of opening slits of the grooves of the stator or rotor in the course of a forward movement of the draw-in star, wherein the pushers remain in a pushed-forward position, at least during a defined first portion of a return movement of the draw-in star.

4. The device in accordance with claim 3, wherein the draw-in star and the pushers have separate controllable drive mechanisms.

* * * * *